United States Patent [19]
Richardson

[11] 3,846,595
[45] Nov. 5, 1974

[54] VEHICLE POWER SYSTEM
[75] Inventor: Raymond H. Richardson, Chicago, Ill.
[73] Assignee: Interlake, Inc., Chicago, Ill.
[22] Filed: June 14, 1973
[21] Appl. No.: 370,173

[52] U.S. Cl. ................ 191/3, 191/22 R, 191/29 R
[51] Int. Cl. ............................................. B60l 1/00
[58] Field of Search ............ 191/1, 2, 3, 5, 7, 22 R, 191/29 R, 45 R

[56] References Cited
UNITED STATES PATENTS
954,342   4/1910   Radius .................................. 191/3
1,828,946  10/1931  Rossman ............................... 191/3

Primary Examiner—M. Henson Wood, Jr.
Assistant Examiner—D. W. Keen
Attorney, Agent, or Firm—Molinare, Allegretti, Newitt & Witcoff

[57] ABSTRACT

In a storage and retrieval installation, electrical power for energizing the load carrier drive conductor buses in the storage frame aisles are energized by way of power from the transfer vehicle through a coupling mounted on the transfer vehicle which moves with the transfer vehicle and engages one of several couplings stationarily mounted on the storage frames only when the transfer vehicle is approximately aligned with a given aisle which is to be energized.

5 Claims, 3 Drawing Figures

VEHICLE POWER SYSTEM

BACKGROUND AND SUMMARY OF THE INVENTION

This invention relates to a vehicle power system and, more particularly, to a system for and method of energizing load carrier aisle conductor buses only when the transfer vehicle is approximately aligned with the aisle.

In mechanized storage and retrieval systems of the type employing a transfer vehicle for transferring a load carrier for operation between several different aisles some means of providing power to conductor buses in the aisles for driving the load carrier must be provided. Also in such systems provision must be made for insuring that the transfer vehicle upon which the load carrier is supported for transfer between the aisles is properly aligned with a given aisle before the load carrier is driven from the transfer vehicle into the aisle, or vice versa. One system which has been provided in the past includes a main conductor which extends across all of the storage frames and leads which continuously energize the individual aisle conductor buses at all times whether or not a load carrier is operating in that given aisle or the transfer vehicle is accurately aligned with that aisle. Such arrangement not only requires extensive wiring, thereby increasing the expense of the overall installation, but also presents a safety hazard, since the load carrier conductor buses in all of the aisles are continuously energized. Moreover, in such prior installations photoelectric circuitry is generally employed at the end of each of the aisles to insure accurate alignment of the transfer vehicle with the aisle, prior to movement of the load carrier either from the aisle onto the transfer vehicle, or vice versa. Such photoelectric circuitry at each aisle not only increases the expense of the system, but such circuitry is also sensitive and must be frequently adjusted and is subject to damage and flase triggering.

The vehicle power system and method of providing power of the present invention obviates either or all of these disadvantages attendant to the prior systems. In the present invention load carrier power is transmitted to the transfer vehicle and thence to the conductor bus of the aisle only with which the transfer vehicle is aligned and the load carrier is to be or is operating. Thereby, aisles in which the load carrier is not presently operating are deenergized and safe for personnel who may be present in these aisles. Moreover, since in the present invention power is transmitted from the transfer vehicle to one given aisle at a time, electric wiring requirements are substantially reduced and either course or accurate alignment may be insured between the transfer vehicle and a given aisle. In the present invention, the likelihood of collision is substantially reduced in the event that the transfer vehicle is accidentially urged out of alignment with a given aisle in which the load carrier is operating. Finally, in the system and method of the present invention, photoelectric fine alignment circuitry with its attendant expense and sensitivity, may be eliminated if desired.

In a principal aspect of the present invention, a vehicle power system includes a plurality of stationary structures spaced from each other to define aisles therebetween and a structure movable across the ends of the aisles and including a vehicle movable in the aisles and to a position beyond the aisles. The improvement in such system comprises in combination therewith, first power transmission means for transmitting power to the movable structure and first coupling means mounted on the movable structure for movement with the structure in a defined path of movement adjacent the ends of the aisles, the first coupling means and first power transmission means being connected for receipt of power by the first coupling means. Second power transmission means and a plurality of second coupling means are each stationarily mounted to an end of the structure adjacent the respective ends of the aisles and spaced in the defined path of travel of the first coupling means such that the first coupling means moves into power transmitting engagement with given ones of the second coupling means when the vehicle at least is approximately aligned with a given one of the aisles and means is associated with the given one of the aisles and is connected to the second coupling means by the second power transmission means for energization of the means when the first and second coupling means are coupled together.

In another principal aspect of the present invention, a method of providing power to a load carrier in a storage and retrieval system only when a transfer vehicle is approximately aligned with a given aisle in the installation, includes the steps of continuously transmitting power to the transfer vehicle, moving the transfer vehicle across the ends of the aisles of the system, moving a first power transmission coupling simultaneously with the transfer vehicle to engage the coupling with a second power transmission coupling adjacent the given aisle to energize the second power transmission coupling with power when the transfer vehicle is at least approximately aligned with the given aisle, and moving the load carrier in response to said engagement between the given aisle and transfer vehicle.

These and other objects, features and advantages of the present invention will be more clearly understood through a consideration of the following detailed description.

BRIEF DESCRIPTION OF THE DRAWING

In the course of this description, reference will frequently be made to the attached drawing in which.

DESCRIPTION OF THE PREFERRED EMBODIMENT

Figure 1:
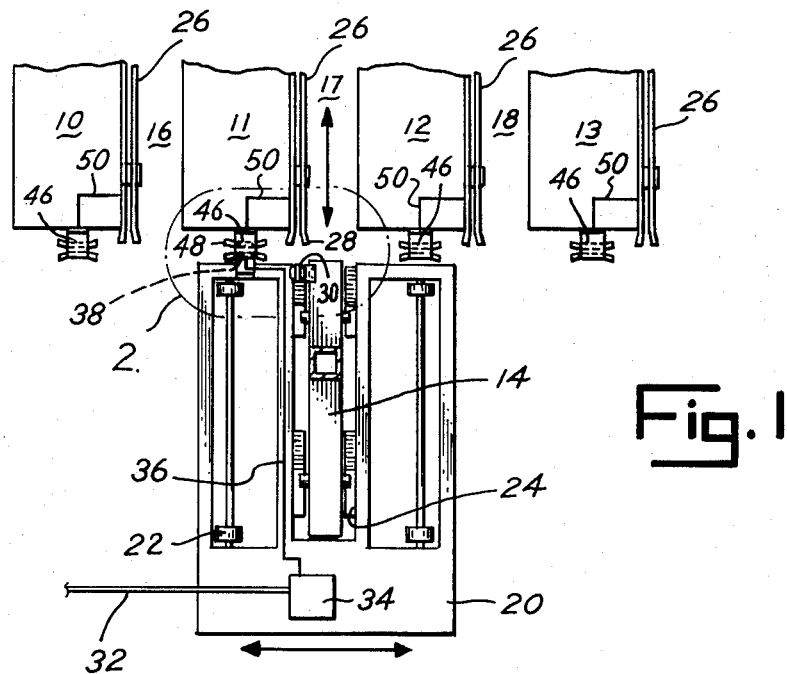
FIG. 1 is a plan view of a storage and retrieval installation incorporating the principles of the present invention.

In the preferred embodiment of invention, a storage and retrieval installation includes a plurality of spaced storage frames 10, 11, 12 and 13 which include bins for the storage of articles and the retrieval thereof by a load carrier 14. The load carrier 14 is adapted to move longitudinally on wheels (not shown) in the aisles 16, 17 and 18 defined between the spaced frames 10-13 and as shown by the vertical arrow in FIG. 1. The load carrier 14 includes suitable fork means (not shown) which are extendible transversely of the load carrier into the respective bins of the storage frames as desired for inserting and removing articles.

A transfer vehicle 20 is also mounted for movement on wheels 22 in a given path adjacent the ends of the frames 10-13 and paths or aisles 16, 17 and 18 for transferring the load carrier 14 between given aisles for operation in the several aisles. One or both the load carrier 14 and transfer vehicle 20 may run directly upon the floor of the installation or upon rails. During transfer, the load carrier 14 is positioned and supported in a transfer berth 24 on the transfer vehicle 20 and the transfer vehicle 20 is powered transversely across the ends of the aisles as shown by the horizontal arrow in FIG. 1. The particular structural details of the storage frames 10-13, the load carrier 14 and the transfer vehicle 20 will not be described herein in detail, since each of these storage and retrieval components are well known to a person skilled in the art.

In the storage and retrieval installation of the present invention, a plurality of conductive buses 26 are located in each of the aisles 16, 17 and 18. Each of the aisle buses 26 includes a guide horn 28 at their ends adjacent the transfer vehicle 20. These horns 28 receive and guide a conductive contact coupling 30 on the load carrier 14 as the load carrier moves into the aisles to transmit power to the load carrier drive mechanism after the load carrier leaves the berth 24 of the transfer vehicle 20.

Figure 2:
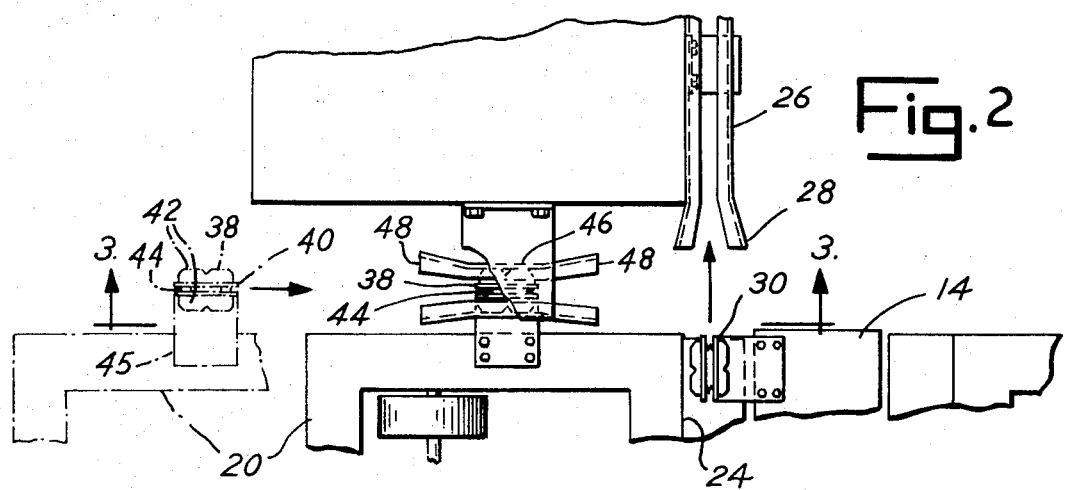
FIG. 2 is an enlarged plan view showing a preferred embodiment of power transmission coupling of the present invention as viewed substantially within line 2 of FIG. 1.

Referring particularly to FIG. 1, a power transmission conductor 32 is attached at one end to a suitable power source (not shown) and at its other end to a conductor reel 34 mounted on the transfer vehicle 20. Power is then conducted via conductor 36 from the conductor 32 which is wound upon reel 34 to an electrical male coupling 38 which is mounted to the end of the transfer vehicle 20 adjacent the ends of the aisles 16-18 and storage frames. This coupling 38 preferably comprises a pair of insulative contact holding plates 40 to which preferably two pairs of conductive contacts 42 are mounted as best shown in FIG. 2. The plates 40 are preferably spring loaded by springs 44 against each other and mounted on a spring loaded platform 45 to assure accurate mating alignment with a plurality of female couplings 46 mounted adjacent the ends of the storage frames 10-13 nearest the transfer vehicle 20. The coupling 30 and the male coupling 38 are preferably of identical construction.

Figure 3:
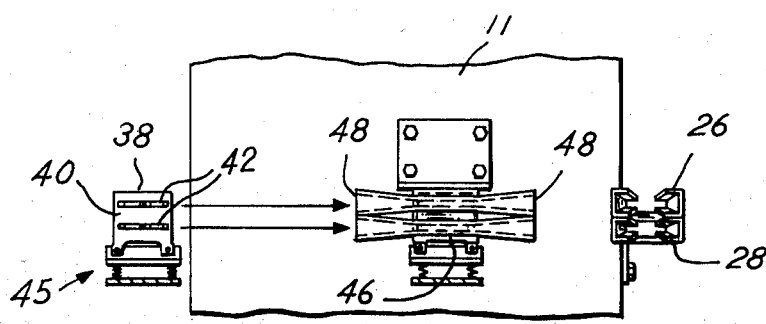
FIG. 3 is a cross sectioned elevation view of the coupling taken substantially along line 3 — 3 of FIG. 2.

The female couplings 46 comprise at least a pair, and preferably four, mating guideways slightly enlarged adjacent either end so as to define guide horns 48 for the receipt and guidance therein of the coupling contacts 40. Both the male 38 and female couplings 46 are positioned such that as the transfer vehicle 20 moves across the ends of the aisles, the male coupling 38 will move in a given path of travel as shown by the arrows in FIGS. 2 and 3 and this path coincides with a line through the female couplings 46 and such that the contacts 40 will enter and transmit electrical power to the female couplings 46. The female couplings 46, in turn, are each connected by way of short power transmission conductors 50 to the conductor buses 26 in each of the respective aisles 16, 17 and 18.

In operation, power is continuously provided to the transfer vehicle 20 by way of conductor 32 and to the contacts 40 of the male coupling 38 by way of conductor 36. If the contacts 40 are not positioned in any given one of the female couplings 46, such as when the transfer vehicle 20 is moving between aisles as shown in dot and dash in FIG. 2, the conductor buses 26 in all of the respective aisles 16, 17 and 18 will be deenergized, thus preventing accidental injury to personnel in the aisles. However, once the transfer vehicle 20 has moved into at least approximate alignment with a given aisle, for example path or aisle 17 as shown in FIG. 1 and in solid as shown in FIG. 2, the energized contacts 40 of the male coupling 36 will enter and engage the female coupling and power will be conducted by way of conductor 50 to the conductor bus 26 in that given aisle only.

If the horizontal width of the contact surfaces of the male and female couplings are sufficiently narrow, no further alignment, such as by way of photocell circuitry or the like, may be necessary. However, if extremely fine alignment is desired, photocell circuitry may be provided, in addition to the couplings 38 and 46. Also, a simple warning light may be connected, either via auxiliary fine alignment sensing contacts or to the conductor buses 26 if the alignment is adequate upon mating of the couplings 38 and 46, to show a visual signal indicative that adequate fine alignment has been achieved.

Once the transfer vehicle 20 has been properly aligned with the aisle in which it is desired to operate the load carrier 14, the load carrier is driven to or from the transfer vehicle under its own power, the latter of which is supplied from the transfer vehicle so long as the load carrier is positioned in berth 24 or from the now energized conductor bus 26 via mating couplings 38 and 46.

It will be understood that if during operation of the load carrier 14 in a given selected path or aisle, the transfer vehicle 20 is accidentally struck or otherwise becomes misaligned with the aisle, such as by way of collision with a fork lift truck, accidental collision of the load carrier 14 and the transfer vehicle 20 is avoided, since the aisle conductor bus 26 will immediately be deenergized. It will be understood that, since only the given conductor bus in the aisle in which the load carrier is presently operating, is energized, and then by way of the transfer vehicle only, that electrical wiring requirements are substantially minimized.

It should also be understood that the embodiment of the present invention which has been described is merely illustrative of one of the applications of the principles of the invention. Numerous modifications may be made by those skilled in the art without departing from the true spirit and scope of the invention.

What is claimed is:

1. In a storage and retrieval system, a method of providing power to a load carrier only when a transfer vehicle is approximately aligned with a given aisle in a storage rack installation, comprising the steps of:
continuously transmitting power to said transfer vehicle,
moving the transfer vehicle across the ends of said aisles, moving a first power transmission coupling simultaneously with said transfer vehicle to engage said coupling with a second power transmission coupling adjacent said given aisle to energize said second power transmission coupling with said power when said transfer vehicle is at least approximately aligned with said given aisle, and moving said load carrier between said given aisle and said transfer vehicle in response to such engagement of said couplings.

2. The method of claim 1 including energizing load carrier power transmission means in said aisle in response to such engagement of said couplings.

3. In a two vehicle system, a method of providing power to one of the vehicles for operation of said one vehicle remotely of said other vehicle in selected ones of a plurality of paths comprising the steps of:

continuously transmitting power to said other vehicle, moving said other vehicle along a given path, coupling the power from said other vehicle to said selected one of said paths automatically upon movement of said other vehicle into alignment with said selected one of said plurality of paths to supply said power to said one vehicle for operation of said one vehicle in said selected one of said paths.

4. The method of claim 3 including the step of moving said one vehicle on said other vehicle between said plurality of paths.

5. The method of claim 3 wherein power is supplied only to said selected one of said plurality of paths upon alignment of said other vehicle with said selected one of said paths.

* * * * *